(12) United States Patent
Wang et al.

(10) Patent No.: US 7,352,597 B2
(45) Date of Patent: Apr. 1, 2008

(54) COMPREHENSIVE POWER QUALITY CONTROLLER FOR SUBSTATION IN POWER SYSTEM

(75) Inventors: Zhaoan Wang, Xi'an (CN); Yue Wang, Xi'an (CN); Jun Yang, Xi'an (CN); Xiao Zhang, Xi'an (CN); Wanjun Lei, Xi'an (CN); Weibin Si, Xi'an (CN); Xiaohua Tang, Xi'an (CN); Qiang Dong, Xi'an (CN)

(73) Assignee: Xi'an Jiaotong University, Xi'an (CN)

( * ) Notice: Subject to any disclaimer, the term of this patent is extended or adjusted under 35 U.S.C. 154(b) by 111 days.

(21) Appl. No.: 11/258,557

(22) Filed: Oct. 25, 2005

(65) Prior Publication Data

US 2007/0014132 A1   Jan. 18, 2007

(30) Foreign Application Priority Data

Jul. 18, 2005   (CN) .......................... 2005 1 0042946

(51) Int. Cl.
*H02J 3/00* (2006.01)
(52) U.S. Cl. ............................ 363/34; 363/41; 323/207
(58) Field of Classification Search ............ 363/34–41, 363/129, 44–48, 155, 64, 154; 323/208, 323/210; 318/438, 716
See application file for complete search history.

(56) References Cited

U.S. PATENT DOCUMENTS 4,560,917 A * 12/1985 Gyugyi ........................ 323/210
5,757,099 A * 5/1998 Cheng et al. ................. 307/105

OTHER PUBLICATIONS

Yue Wang, Zhaoan Wang, Jun Yang, Jinjun Liu, Zhiping Fu, Yung Dum, and Yahan Hua, *A Novel Comprehensive Compensator for Electrified Railway System*, pp. 1032-1037, Jun. 15-19, 2003.
Jun Yang, Yue Wang, and Zhaoan Wang, *A DSP Controlled Hybrid Power Filter Used To Compensate The Harmonics And Reactive Power Caused By Electrical Traction Loads*, pp. 1615-1620, Jul. 13-17, 2003.

(Continued)

Primary Examiner—Rajnikant B. Patel
(74) Attorney, Agent, or Firm—Patterson, Thuente, Skaar & Christensen, PA

(57) ABSTRACT

This invention disclosed is a comprehensive power quality controller for substation in the electric power system and includes a Thyristor Controlled Reactor (TCR), pure tuned passive filter $Z_f$, additional inductor L active power filter (APF), and a coupling transformer. The Thyristor Controlled Reactor (TCR) provides inductive reactive power and controls the active power filter (APF) as the current source, it is connected with the additional inductor $L_a$ in parallel via the coupling transformer, then connected to the passive filter $Z_f$ in serial to consist a hybrid power filter system, which is connected to the power grid via the circuit breaker or thyristor. The comprehensive filter system provides required capacitive reactive power and filters the harmonic produced by the load and TCR system itself. Because the capacity of the active power filter (APF) is very small which is less than 1% of the harmonic source capacity, so it is a solution with low cost but simple and reliable control mode. It can suppress influence on the passive filter by the "background harmonic" of the substation and prevent the resonance occurred between the passive filter and power grid impedance.

2 Claims, 5 Drawing Sheets

OTHER PUBLICATIONS

Jun Yang, Yue Wang, Yong Duan, Zhiping Fu, and Zhaoan Wang, *A Three-Phase Comprehensive Reactive Power And Harmonics Compensator Based On A Comparatively Small Rating APF*, pp. 204-209, Feb. 22-26, 2004.

Yue Wang, Jun Yang, Zhaoan Wang, Xiaobo Su, Zhidong Zeng, Weian Wang, Zhibi Guo, and Xiaofang Wang, *Rating Analysis And Design Of Coupling Transformer For Single-Phase Parallel Hybrid Active Filter*, copyrighted 2002, pp. 602-606.

San-Yi Lee and Chi-Jui Wu, *Combined Compensation Structure Of A Static Var Compensator And An Active Filter For Unbalanced Three-Phase Distribution Feeders With Harmonic Distortion*, copyrighted 1998, pp. 243-250.

* cited by examiner

COMPREHENSIVE POWER QUALITY CONTROLLER FOR SUBSTATION IN POWER SYSTEM

FIELD OF THE INVENTION

The present invention is on the subject of a comprehensive power quality controller, especially relates to a kind of comprehensive power quality controller used for the substation in the electric power system.

BACKGROUND

The reactive impacts and harmonic produced by the non-linear load of the electric power system have severely threatened the safe operation and high quality power supply of the electric power system.

The hazards of the reactive power are:

(1) When the reactive power increases, the current grows as well as the apparent power of the power supply equipment increases accordingly; further more, it will lead to the dimension and specification augmentation of the starting equipment, control equipment and measuring instrument.

(2) The loss of the equipments and lines increases. The increase of the reactive power leads to the growth of the total current, so that the loss of the equipments and lines increases.

(3) The augmentation of the transformer and line drop leads to the severe power grid voltage fluctuation.

(4) The voltage fluctuation is mainly caused by the reactive fluctuation, which will lead to severe voltage fluctuation if it is caused by the impact reactive loads.

The hazards of the harmonic are:

(1) The harmonic make the equipments generate the additive harmonic loss, results in decreasing the efficiency of the power supply and distribution equipments as well as power consumption.

(2) The harmonic will influence the normal operation of various electric equipments and will lead to over voltage and over current, which give rise to the severe overheating of the transformer and the overheating of the capacitor and cable, the ageing of the insulation and curtailment of the lifetime.

(3) The harmonic will give rise to the local harmonic amplification in the public grid, even give rise to the parallel resonance and serial resonance, this phenomenon will lead to the equipment damage and safety misadventure, which deserves special attention.

(4) The harmonic will lead to the misconduct and operation refusal of the relaying protection and automatic devices.

Moreover, for the three-phase four-wire system, a great deal of 3n harmonic flows through the midline, which leads to the line overheating and easy component burning. The harmonic will influence the normal operation of the electric equipment, e.g., it will lead to the electric equipments mechanical vibration and noise, lifetime curtailment, even damage; it will make the measuring instrument accuracy decrease. The harmonic will severely interfere with the neighboring communication system, automation system and the systems composed of the micro electrics or computer equipments; slightly it will generate noise and decrease the operational quality, severely it will lead to the information loss and abnormal work. It is understood that the adverse effects of the higher harmonic are appeared in various respects, and effective measures shall be taken to suppress it.

In the electric power system, there are many methods to compensate the reactive power, but the Static Var Compensator using thyristor components has good performance, so in recent years, it grows stable in the world sphere and occupies the dominant position in the Static Var Compensator markets. So the Static Var Compensator (or SVC) usually means the static compensator using thyristor components, including the Thyristor Controlled Reactor (abbreviated as TCR), Thyristor Switched Capacitor (abbreviated as TSC) and the combination of these two devices (TCR+TSC), or the Thyristor Controlled Reactor and the Fixed Capacitor (abbreviated as FC), or Mechanically Switched Capacitor (abbreviated as MSC) and the mixed devices (for example, TCR+FC, TCR+MSC, etc.). Wherein, the TCR has the advantages of rapid response, reliable operation, stepless compensation, phase adjustment, power balance, wide application scope and cheap price. Therefore, the main electric equipment manufacturers in the industrial developed countries produce and actively promote this device, which is most widely used and is the mainstream for development. Currently more than 220 sets of the SVC with total capacity of 35000 Mvar are operating in the electricity transmission and distribution systems and more than 380 sets of the SVC with total capacity of 18000 Mvar are operating in the industrial sectors. The estimation shows that the SVC will have more developments in the electricity transmission and distribution fields and industrial users.

There are two methods to eliminate the harmonic in the power supply system: one is to filter the waves with passive LC filter or active power filter, the other one is to modify the harmonic source, for example, to improve the phase numbers of the convertor and adopt high power factor rectifier. Based on the harmonic absorption, the passive filter can compensate the reactive power and improve the power factor with features of simple structure and low cost; at the same time, due to its characteristics of easy maintenance, relative mature technology, design and manufacturing experiences, the passive filter solution is the most widely adopted major mean to suppress the harmonic and compensate the reactive power. But the passive power filter (PPF) has following defects: (1) the filter feature can be heavily influenced by the system parameters and working conditions, it is difficult for designers. Because the resonance frequency relies on the parameters of the components, it can only filter the major harmonic; the drift of the LC parameters will lead to the change of the filer feature, which makes the filter performance unstable. (2) The power grid parameter and LC may produce parallel resonance which leads to the component amplification of the harmonic and the power supply quality of the power grid decreases. (3) Sometimes it is difficult to coordinate the filter requirements, reactive power compensation and voltage adjustment requirement.

Another important trend to suppress the harmonic is to adopt the active power filter, because the active power filter can dynamically compensate the harmonic, reactive power and has negative sequence current without the resonance for the system; it produces better filtering effects than the passive electric power filter. But the active power filter is not used in China due to its large capacity and high cost.

There is always a close relationship between the reactive power compensation and harmonic suppression, both of their technology development and progress are mutually coordinated, the active filter can overcome the defects of passive filter in the real operation, which the compensation feature can be influenced by the power grid impedance variation and operation status, or it produces the harmonic amplification with the system, or even the parallel resonance. If a hybrid power filter is composed by combination of the passive filter and active filter, which can draw upon one another's strong points and compensate the weakness and has the advantages of these two filters, this solution is the hotspot for harmonic suppression research.

In the conventional compensation devices, the reactive power compensation, negative sequence current suppression and harmonic current suppression are carried out respectively and separately, which have not been omni-directionally streamlined according to a uniform mathematic model. The imperfection of the theory often leads to the conditions of taking one into consideration to the neglect of the other in the practice, even brings unfavorable influences among them. Because of adopting different devices to independently compensate, it is difficult to reach the purposes of complete compensation. The installation and maintenance working load is heavy and the cost-effective ratio is low.

It can be seen from the above introduction and analysis on the prior art that, currently there are no reports in China and overseas on dividing the LC filter branch of the passive filter into the pure tuned and additional inductance, then putting the active power filter parallel to the serial inductance.

SUMMARY OF THE INVENTION

Aiming at the defects or imperfection of the existing technology, the purpose of this invention is to provide a comprehensive power quality controller for the substation in the electric power system, which can improve the power energy quality, improve the safety of the electric power system, economic operational level and decrease the pollution abatement cost.

In order to realize the above purpose, the present invention provides a technical solution of: a comprehensive power quality controller includes a Thyristor Controlled Reactor (TCR) and a pure tuned passive filter $(Z_f)$ which are connected to the power grid in parallel, said flat tuning passive filter $(Z_f)$ is connected to the one end of an additional inductance $(L_a)$ in serial, the other end of said additional inductance $(L_a)$ is grounding, said additional inductance $(L_a)$ is connected with the active power filter (APF) in parallel via a coupling transformation (T).

The pure tuned passive filter $(Z_f)$ is connected to the additional inductance $(L_a)$ in serial, and the active power filter (APF) connected with the additional inductor $(L_a)$ in parallel is controled as the current source.

The pure tuned passive filter $(Z_f)$ can be composed of the filters tuned at thrice, quintet and seven times serial resonance filters connected in parallel.

In this invention, the Thyristor Controlled Reactor (TCR) circuit is connected to the power grid in parallel, which is equivalent to the AC voltage adjust circuit structure of the inductive load. The absorbed harmonic current and reactive power diminishes accordingly when the controlled angle α increases to realize the purpose of adjusting the reactive power. The variation of the load is balanced by the reactive power variation produced by the TCR, which makes the total of two currents maintains at a constant, the constant inductive reactive power is offset by the capacitive reactive power of the FC, which ultimately make the power factor of the power grid maintain at a presetting value, e.g., above 0.95.

For the comprehensive power quality controller for the substation in this invention, its inductive reactive power required by the system and the voltage fluctuation produced by the stable load impact is provided by the Thyristor Controlled Reactor (TCR). In this invention, the original fixed frequency deviation passive filter is modified into the connection in serial of the pure tuned LC filter circuit and additional inductor $L_a$, then the active power filter (APF) is controlled as the current source and is connected to the additional inductor $L_a$ in parallel, which compose of the hybrid power filter. This hybrid power filter system offers the required capacitive reactive power, filters the harmonic produced by the load and the TCR system itself. In the comprehensive power quality controller used for substation, because the capacity of the active power filter (APF) is very small, which is less than 1% of the harmonic source capacity (all the fundamental reactive power current flows into additional inductor $L_a$, without passage of the active filter), it does not increase much cost but it can greatly improve the filter performance. It can suppress the influence on the passive filter by the "background harmonic" of the substation, and prevent the resonance occurred between the passive filter and power grid impedance, which greatly strengthen the integrating safety and reliability of the filter system. Even if the active part fails, it can automatically separate from the system by fuse, the Thyristor Controlled Reactor TCR and the passive filter can still realize the original reactive power and harmonic compensation functions, so the control mode of the active filter is simple and reliable.

BRIEF DESCRIPTION OF THE DRAWINGS

FIG. 4 (f) is load and current on source side waveform Fourier analysis result diagram before and after the compensation.

DETAILED DESCRIPTION

A set of attaching drawings is an embodiment of the Invention.

The detail and the basic principle of the invention are further described below in detail combined with attaching drawings.

Figure 1:
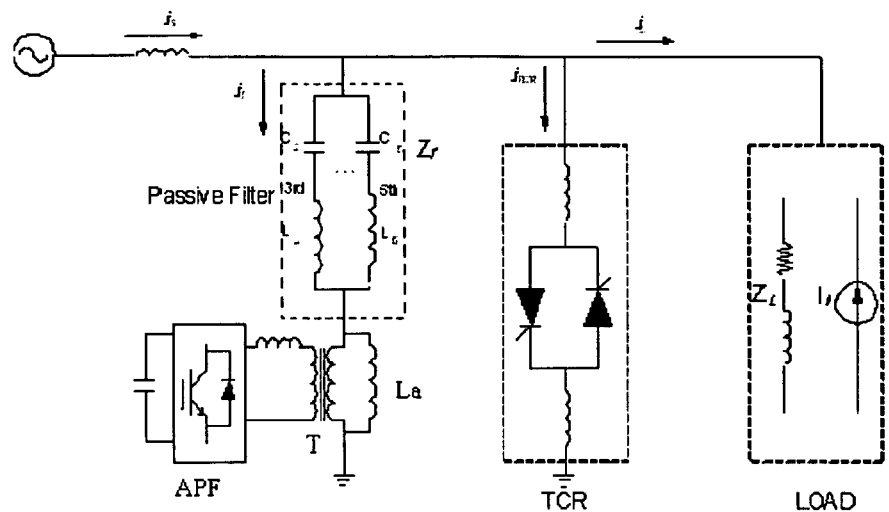
FIG. 1 is the schematic diagram of the comprehensive power quality control system used for substation in this invention.

As shown in FIG. 1, the Load at the most right side produces the harmonic current and consumes the reactive power, it is connected between the generating line of the power grid and grounding. The Thyristor Controlled Reactor (TCR) is connected to the power grid in parallel, a group of pure tuned LC passive filter $Z_f$ (which are separately composed of the filters tuned at thrice and quintet LC in parallel, it depends on the filter and reactive power compensation performance to determine which branches may be included.) connect to grid source line in parallel. The active power filter (APF) and additional inductor $L_a$ are connected in parallel via the coupling transformer T, then it is connected between the pure tuned passive filter and grounding. The main circuit of the APF adopts the single phase bridge structure, of which the switch component adopts IGBT, its control signal comes from the drive circuit.

Figure 2:
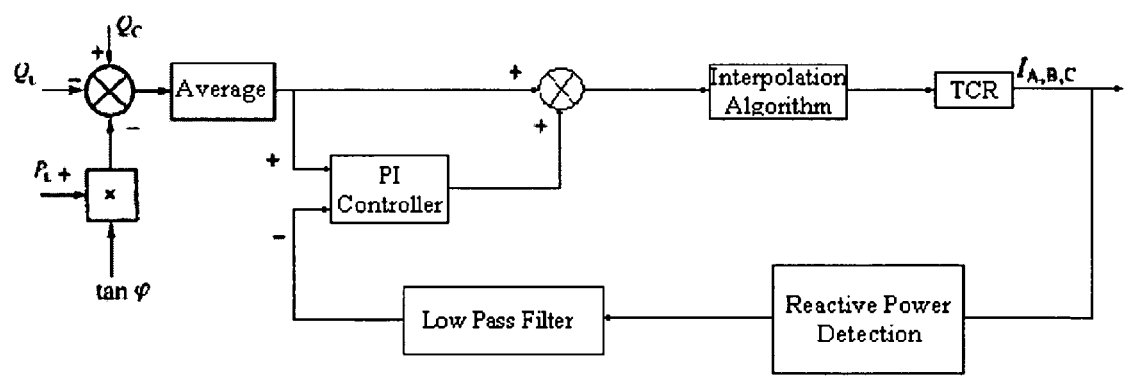
FIG. 2 is the schematic diagram of the Thyristor Controlled Reactor (TCR) digital control system in this invention.

Other reference symbols in FIG. 1 are explained as following:

$i_S$—current on source side
$i_F$—filter system current
$i_{TCR}$—Thyristor Controlled Reactor compensation current
$i_L$—load current Referring to FIG. 2, based on the detecting method of the instantaneous reactive power theory, the digital control system detects the values of reactive power $Q_L$ produced by the load, capacitive reactive power $Q_C$ provided by the passive filter $Z_f$ and active power $P_L$ of the power grid; the reactive power $Q_{TCR}$ which is needed to be compensated by the Thyristor Controlled Reactor (TCR) is calculated according to the presetting value φ via the power factor angle of the compensated power grid, after the process of the averaging, the output is divided into two branches, one branch is transmitted to the feed-forward, the other is transmitted to the PI regulator. The input to the PI regulator is the difference between the given quantity and the feedback quantity, wherein, the feedback quantity is gained via the reactive power detecting by the compensation current used to detect the Thyristor Controlled Reactor (TCR) and then filtering via the filter. The output of the PI regulator and the feed-forward quantity are participating the calculation of the onstate angle. The advantages of combining these two control modes are: The feed-forward part can response immediately and improve the rapidity of the system; while adopting proportion integral regulator, it not only gives attention to both advantages of the rapid response of the proportion regulator and the static elimination of the integral regulator, but also improves the stability of the system. At last, the triggering angle α of the Thyristor is calculated via the linear interpolation method. Corresponding to different triggering angle α, the corresponding current value $i_{TCR}$ of each TCR phase can be calculated.

Figures 3A, 3B:
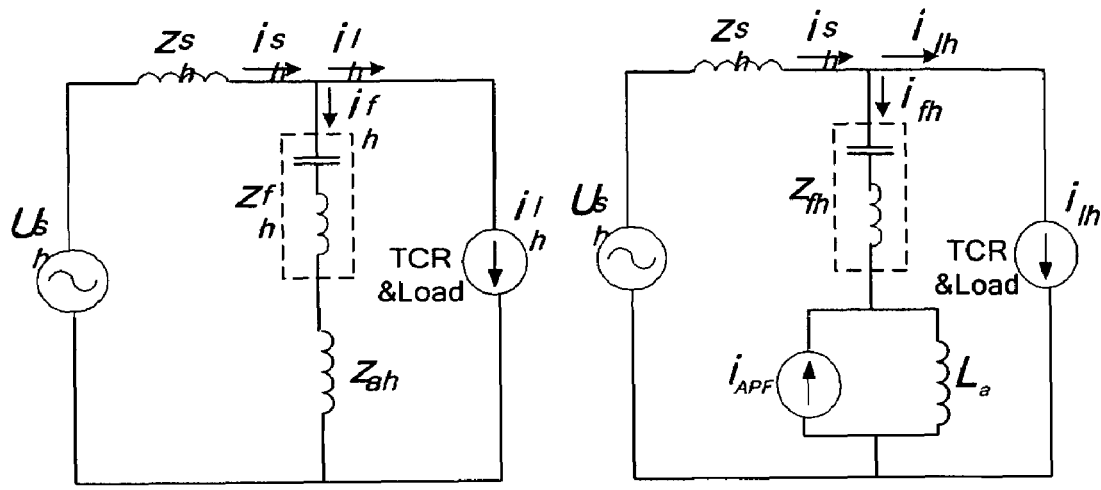
FIG. 3(a) is the equivalent circuit diagram of the passive filter for the comprehensive filter system in this invention.
FIG. 3(b) is the equivalent circuit diagram of the hybrid power filter system in this invention.

As shown in FIG. 3(a), (b), the APF control is a controlled current source $i_{APF}$, $i_{APF}=k_l \cdot i_{Lh\&TCRh}+k_s \cdot i_{sh}$, $i_{Lh\&TCRh}$, $i_{sh}$, they respectively serve as the harmonic components of the load, the side current of the Thyristor Controlled Reactor (TCR) and the current on source side, the $k_l$, $k_s$ are respectively the gain factors of the feed-forward and feedback, the harmonic source can be treated as a current source $i_{Lh\&TCRh}$, $i_{Lh\&TCRh}=i_{Lh}+i_{TCRh}$.

When the active filter is not connected, the harmonic current $i_{lh}$ produced by the load and the Thyristor Controlled Reactor (TCR) are compensated by the passive filter. Concluded from the FIG. 3(a) that:

$$i_{sh} = \frac{1}{z_{sh}+(z_{fh}+z_{ah})} v_{sh} + \frac{(z_{fh}+z_{ah})}{z_{sh}+(z_{fh}+z_{ah})} i_{Lh\&TCRh} \quad (1)$$

If the power grid impedance is very small ($|Z_s|\approx 0$), generally in order to prevent the phenomenon of the harmonic amplification produced by the resonance between the pure tuned passive filter and power gird impedance, the inductance $L_a$ is connected in serial with the branch of the pure tuned passive filter, so that the whole reactive power branch impedance ($Z_{fh}+Z_{ah}$) is relatively large in general, which leads to the unfavorable filtering effect of the passive filter.

If the active filter is connected and controlled as a current source according to following rules:

$$i_{APF} = k_l \cdot i_{Lh\&TCRh} + k_s \cdot i_{sh} \quad (2)$$

When the active filter controls according to the above-mentioned rules, it is understood from the FIG. 3(b) that:

$$i_{sh} = \frac{1}{z_{sh}+z_{fh}+(1+k_s)\cdot z_{ah}} v_{sh} + \frac{z_{fh}+(1-k_l)\cdot z_{ah}}{z_{sh}+z_{fh}+(1+k_s)\cdot z_{ah}} i_{Lh\&TCRh} \quad (3)$$

Because the $Z_{fh}\approx 0$, in the feed-forward control process, the feed-forward control gain factor $k_l$ is set at the value 1, and get the relative large value of the feedback factor $k_s$ in the feedback control when the system is not in resonant status; from the Formula (3), it is understood the part of the power grid current harmonic produced by the load harmonic current source will mainly flow into the filtering branch, the part produced by the power grid harmonic voltage will be certainly suppressed via the feedback control.

The following is a simulation example of the comprehensive power quality controller used for substation:

Based on the Matlab/Simulink simulation software, we simulate the functions of the comprehensive power quality controller used for power substations. The passive filter parameters are: quintet filter: $L_5$=3.03 mH, $C_5$=133.70 μF; seven times filter: $L_7$=3.54 mH, $C_7$=58.45 μF; the additional inductor $L_a$=0.516 mH.

Figure 4A:
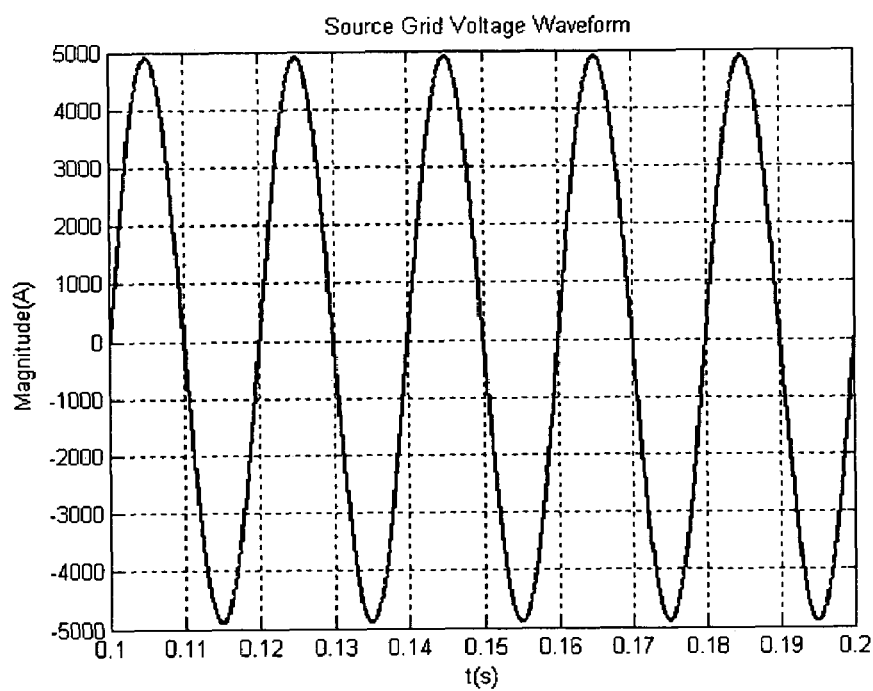
FIG. 4(a) is the source grid voltage waveform oscillogram.
Figure 4B:
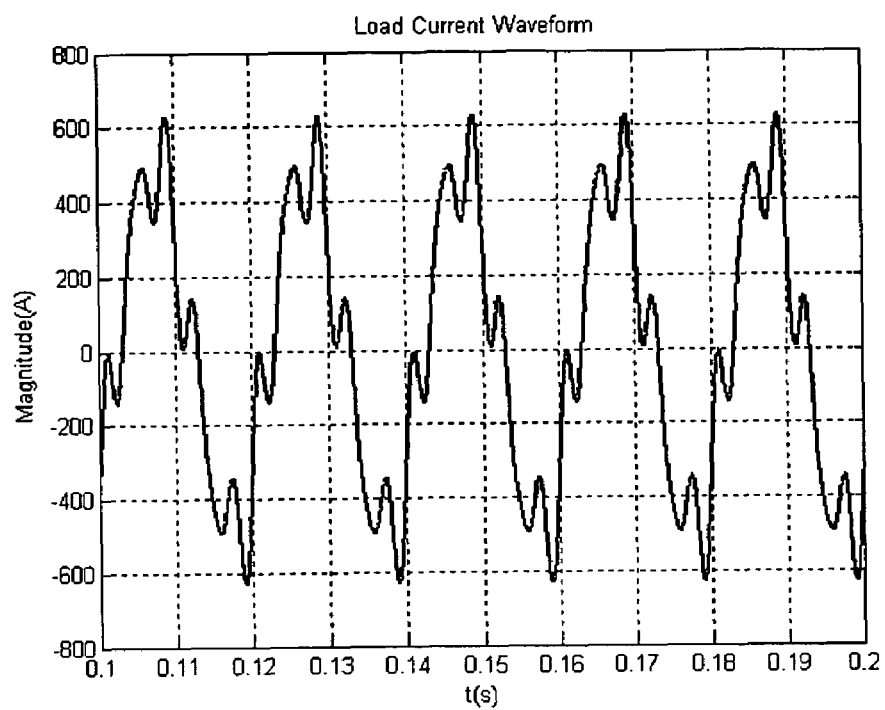
FIG. 4(b) is the load current waveform oscillogram.
Figure 4C:
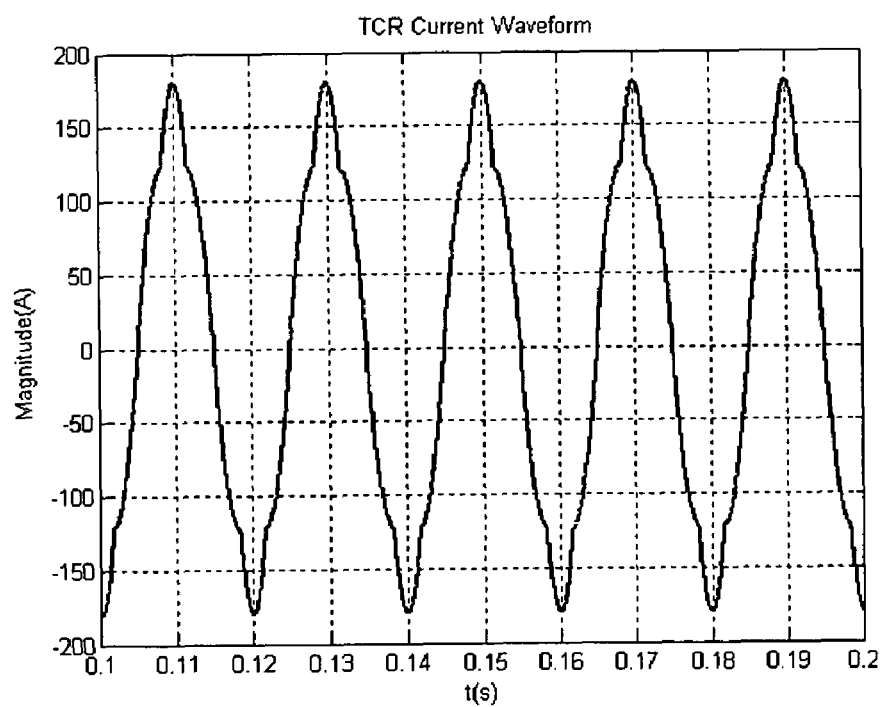
FIG. 4(c) is the compensation current waveform oscillogram of the Thyristor Controlled Reactor.
Figure 4D:
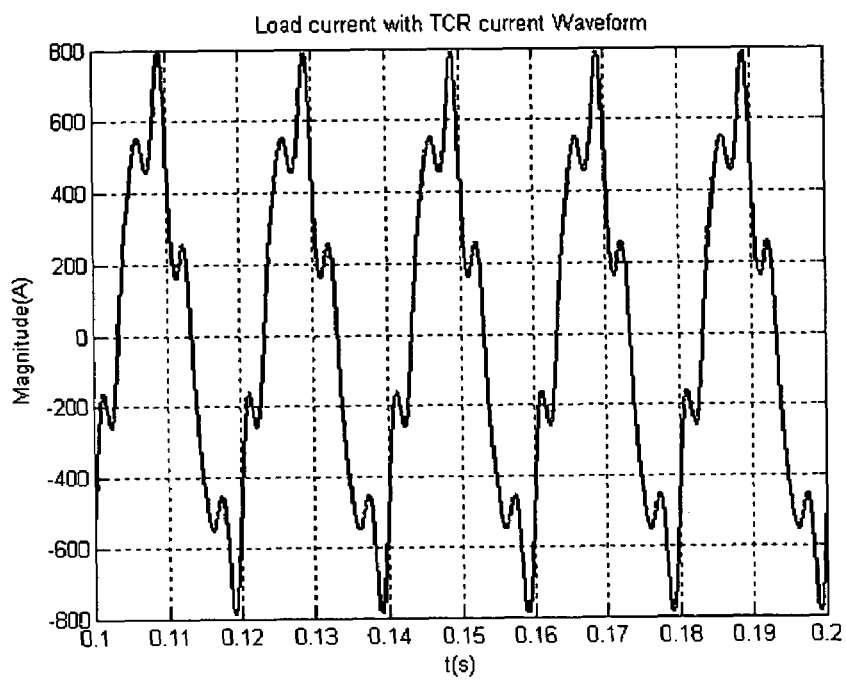
FIG. 4(d) is the compensation current and load current waveform oscillogram of the Thyristor Controlled Reactor.
Figure 4E:
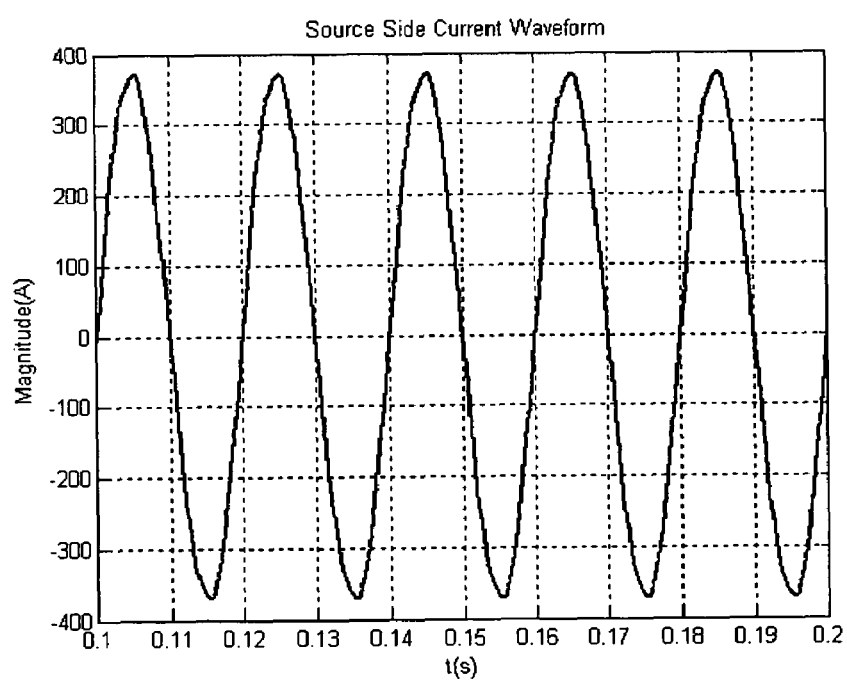
FIG. 4 (e) is the current waveform oscillogram on source side side after compensation.
Figure 4F:
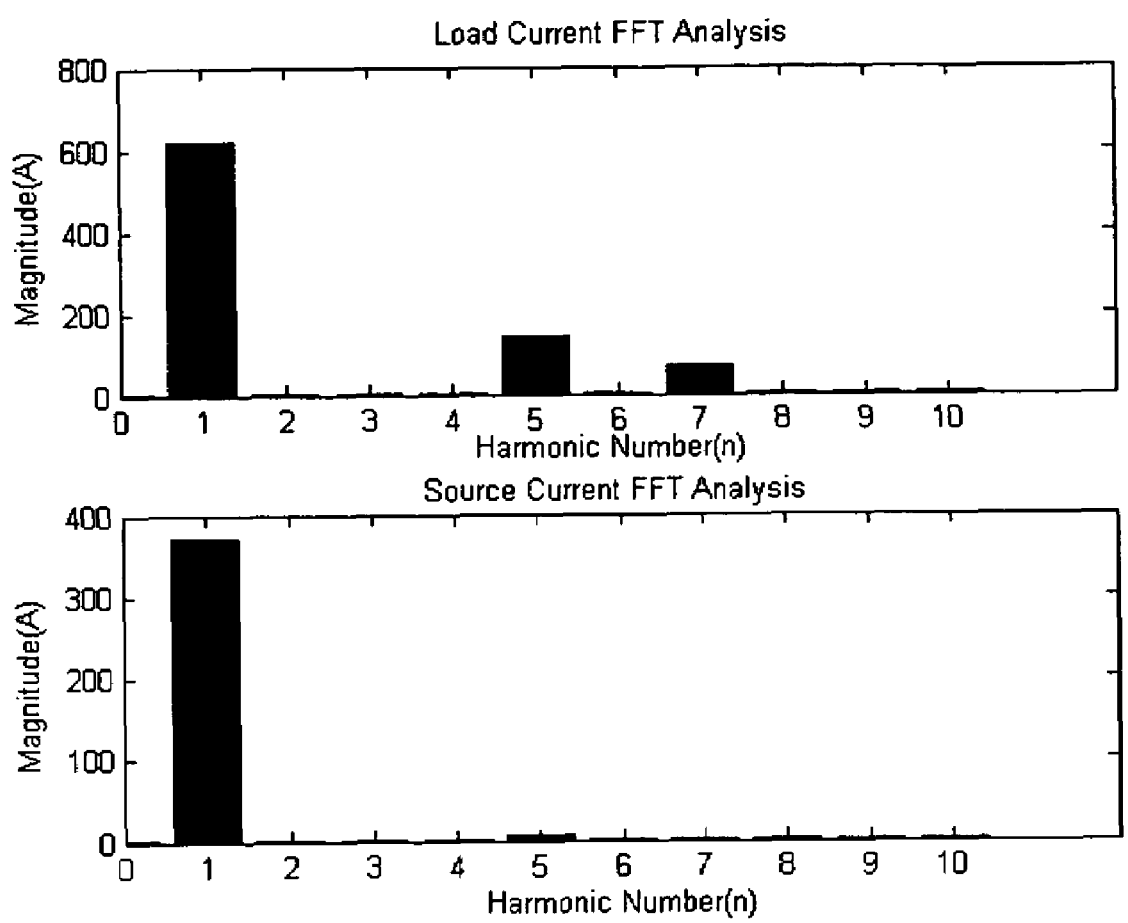

Referring to FIG. 4, it shows the simulation result waveform diagram, wherein FIG. 4(a), the horizontal ordinate means time, the ordinate means the voltage value, the crest voltage is 6000 V in the simulated power grid; in the FIG. 4(b, c, d, e), the horizontal ordinate means time, the ordinate means the current value, wherein, the FIG. 4(b) shows the wave forms of the load current, its fundamental wave current phase is behind the power grid voltage and includes quintet and seven times harmonic current; FIG. 4(c) shows the compensation current produced by the Thyristor Controlled Reactor, we can see that it includes quintet and seven times harmonic current itself; FIG. 4(d) shows the waveform of the summation of the load current and the Thyristor Controlled Reactor compensation current, it is the current detected by the hybrid power filter system; the FIG. 4(e) shows the current on source side waveform after the compensation, is shows that its waveform has the same phase with the power grid voltage and it basically a sine fundamental wave; the coordinate in the FIG. 4(f) means the times of the harmonic and the ordinate means the value, we can learn that after the compensation, the quintet and seven times harmonic of the load is reduced obviously, by integrating the simulation results, the following list is generated:

The table on the quintet and seven times current inclusion rate in the power current and system power factor

| Comparing circumstances | Comparing items | | | |
|---|---|---|---|---|
| | 5th harmonic current value | 7th harmonic current value | Total harmonic Distortion | Power factor |
| Without compensation | 100 A | 50 A | 25.45% | 0.736 |
| After using comprehensive power quality controller | 4.09 A | 0.5852 A | 1.96% | 0.999 |

It is learned from the simulation results, after using the comprehensive power quality controller, it not only obviously improves the power factor from 0.736 to near 1 (one) after compensation, but also compensates the typical harmonic current in the load; for example, the 5th, 7th harmonic currents are reduced respectively from 100A, 50A to 4.09A, 0.5852A, and the capacity of the APF is less than 1% of the load capacity of the harmonic source, so this comprehensive power quality controller used for substation has very high industry practicality.

The invention claimed is:

1. A comprehensive power quality controller for a substation in an electric power system, comprising a Thyristor Controlled Reactor (TCR), a pure tuned passive filter ($Z_f$), an active power filter (APF) and a coupling transformer, wherein the active power filter (APF) is connected with an additional inductor ($L_a$) in parallel via the coupling transformer, then connected to the passive filter ($Z_f$) in series to comprise a hybrid power filter system, and the Thyristor Controlled Reactor (TCR) is connected to a power grid in parallel, wherein said additional inductance ($L_a$) is connected with the active power filter (APF) in parallel, and the active power filter (APF) is a controllable harmonic current source, so as to bypass the reactive current and greatly reduce the power rating of the active filter.

2. The power quality controller according to claim 1, wherein said pure tuned passive filter ($Z_f$) comprises filters tuned at three times, five times and seven times in serial resonance connected in parallel.

* * * * *